United States Patent
Gazaille et al.

(10) Patent No.: US 8,066,920 B2
(45) Date of Patent: Nov. 29, 2011

(54) METHODS FOR CONTROLLING AND ENHANCING THE QUALITY OF BASE MATERIALS EMPLOYED FOR THE PRODUCTION OF SEMI-FINISHED OPHTHALMIC LENSES

(75) Inventors: Daniel Gazaille, Palmer, MA (US); Paresh Kitchloo, North Attleboro, MA (US); Russell F. Weymouth, Jr., Charlton, MA (US)

(73) Assignee: Gentex Optics, Inc., Carbondale, PA (US)

( * ) Notice: Subject to any disclaimer, the term of this patent is extended or adjusted under 35 U.S.C. 154(b) by 184 days.

(21) Appl. No.: 12/482,927

(22) Filed: Jun. 11, 2009

(65) Prior Publication Data

US 2010/0314786 A1    Dec. 16, 2010

(51) Int. Cl.
B05D 5/12    (2006.01)

(52) U.S. Cl. ...... 264/40.1; 264/1.1; 264/1.26; 264/1.29; 264/1.31; 264/1.32; 264/1.33; 264/1.34; 264/1.7; 264/1.8; 264/1.9; 264/2.5; 264/2.6; 264/2.7; 264/1.24; 264/297.1; 264/297.8; 65/387; 65/37; 65/39; 359/645; 359/643; 351/159; 425/808; 73/150 R; 73/864.53

(58) Field of Classification Search .............. 264/1.1, 264/1.26, 1.29, 1.31, 1.32, 1.33, 1.34, 1.7, 264/1.8, 1.9, 2.5, 2.6, 2.7, 40.1, 1.24, 297.1, 264/297.8; 65/387, 37, 39; 359/645, 643; 351/159; 425/808; 73/150 R, 864.53
See application file for complete search history.

(56) References Cited

U.S. PATENT DOCUMENTS

| | | | |
|---|---|---|---|
| 4,908,169 A | 3/1990 | Galic et al. | |
| 4,965,315 A | 10/1990 | Maeda et al. | |
| 5,559,173 A * | 9/1996 | Campo et al. | 523/303 |
| 5,723,517 A | 3/1998 | Campo et al. | |
| 6,367,930 B1 * | 4/2002 | Santelices et al. | 351/177 |
| 6,605,686 B2 | 8/2003 | Takemoto et al. | |
| 6,686,041 B2 | 2/2004 | Sakamoto et al. | |
| 2003/0168758 A1 | 9/2003 | Bickel | |
| 2008/0004407 A1 | 1/2008 | Berndsen et al. | |

* cited by examiner

*Primary Examiner* — Jeffrey Wollschlager
*Assistant Examiner* — Stella Yi
(74) *Attorney, Agent, or Firm* — Keusey & Associates, P.C.

(57) ABSTRACT

Optical qualities of a production lot of base material used in the fabrication of semi-finished lenses may be accurately determined by employing chipper plate samples produced from the base material in accordance with aspects of the present invention. In various implementations of the present invention, the chipper plates samples may be fabricated by subjecting base material to an extended cycle time and temperature profile using a mold having cavities of different thicknesses. The resulting chipper plates provide an improved indication of the color of semi-finished lenses molded from the production lot as well as an improved indication of resin stabilizer defects that may be utilized during a pelletizing process to control and enhance the quality of a production lot. Furthermore, the chipper plates may be provided by suppliers as samples of a production lot to enable customers to base purchasing decisions on a reliable and accurate measure of optical properties.

24 Claims, 8 Drawing Sheets

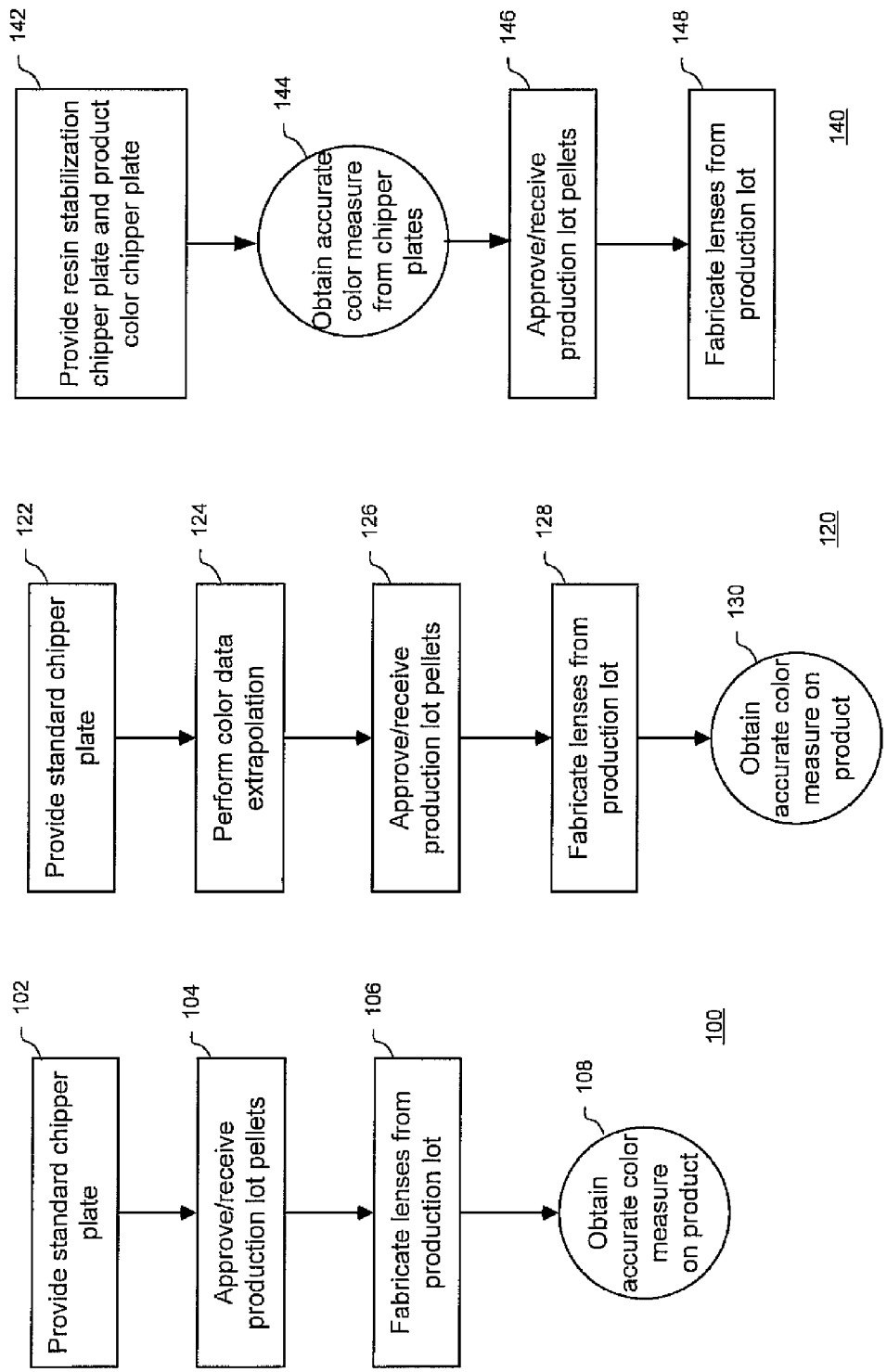

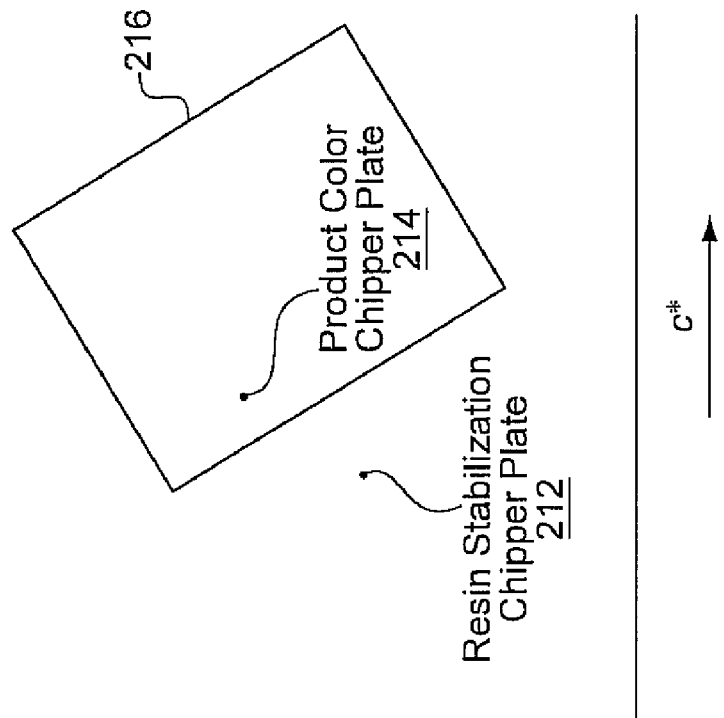
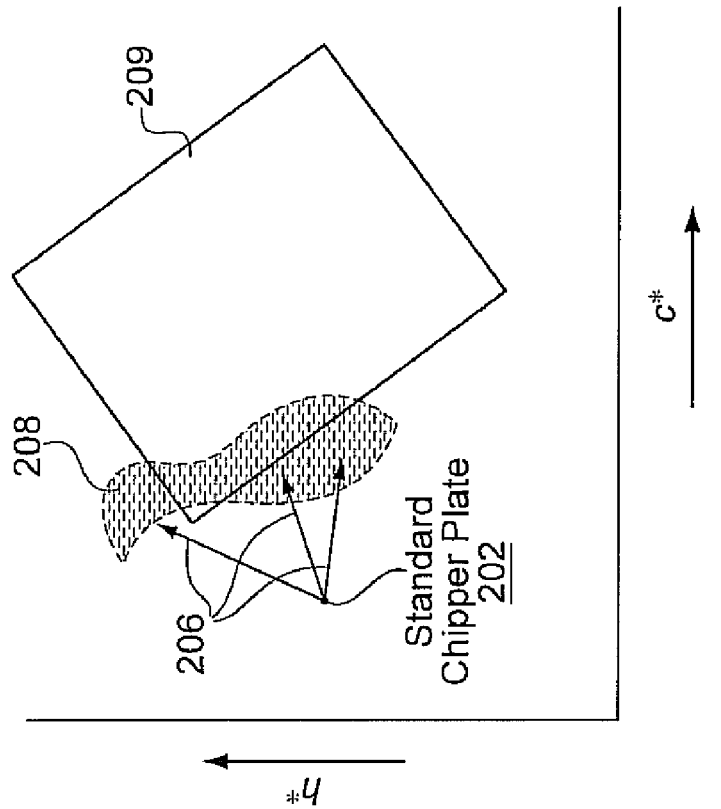
FIG. 2B
FIG. 2A (Prior Art)

US 8,066,920 B2

METHODS FOR CONTROLLING AND ENHANCING THE QUALITY OF BASE MATERIALS EMPLOYED FOR THE PRODUCTION OF SEMI-FINISHED OPHTHALMIC LENSES

BACKGROUND OF THE INVENTION

1. Field of the Invention

The present invention relates to methods for determining and controlling the quality of optical properties of base material used in the fabrication of semi-finished ophthalmic lenses.

2. Description of the Related Art

In the ophthalmic lens manufacturing industry, polycarbonate material used in the fabrication of lenses is selected and purchased by manufacturers based upon testing of chipper plate samples representative of a production lot of the polycarbonate material. The production lot of polycarbonate material is commonly produced in the form of pellets having a length of between two and four millimeters and a diameter of between one and four millimeters. Typically, lens manufactures select candidate materials from a supplier catalogue describing optical property specifications. Although the general chemical composition of various production lots representing a specific material is essentially the same, different production lots of the material used in the fabrication of lenses commonly result in lenses that have different optical qualities, such as color and ultra-violet light transmission, due to variations in manufacturing conditions of the production lot. Such variations may include different raw material characteristics, concentration variations, production machine differences, feed rate inaccuracies in processing, environmental impurities, and other factors. Accordingly, to enable lens manufacturers and other customers to confirm the optical properties of a specific production lot, suppliers provide customers with a rectangular, five-millimeter thick, standard chipper plate with a dimension of approximately a 50 mm×75 mm molded from the production lot to permit customers to conduct quality testing. Upon confirming that the chipper plate meets the customer's specification requirements, the production lot is purchased from the supplier and shipped to the customer. Depending on the production scale of particular lens manufacturers, a production lot size is commonly between several hundred pounds to several tons.

While the standard chipper plate employed by suppliers may be sufficient to provide an indication of optical properties of a polycarbonate production lot for many applications, the standard chipper plate is typically a poor indicator of optical properties of semi-finished ophthalmic lenses fabricated from the production lot. Lens manufacturer color, ultra-violet light transmission and other optical property specifications are especially precise and the current method by which lens manufacturers obtain an indication of color properties is inadequate in providing a true measure of color properties of a semi-finished lens molded from the production lot. For example, a high level diagram of a prior art production lot confirmation and purchase process 100 is provided in FIG. 1A. The process may begin at step 102 in which a 5-mm thick standard chipper plate is provided to a customer for quality testing. If the initial testing reveals that the production lot meets customer requirements, the customer may purchase and receive production lot pellets at step 104. Thereafter, at step 106, lenses are fabricated from the production lot and, at step 108, an accurate measure of product color, for example, is obtained by quality control testing. In most cases, the lens color properties are very different from the measured color properties of the 5-mm thick standard chipper plate.

To improve the results of the initial testing of the standard chipper plate, and thereby avoid purchasing a defective production lot, lens manufactures have resorted to mathematical extrapolation schemes based on historical data to predict a lens color of lenses molded from the production lot. FIG. 2A is a c*h* scale color plot 200 that provides an illustrative example of mathematical extrapolation employed by lens manufacturers. Element 202 is an exemplary representation of color values measured from a standard chipper plate and element 209 is an acceptable color region of molded articles suitable for use in ophthalmic lenses. Angular vectors 206 are determined based on historical data to extrapolate the color value 202 and to construct a color region 208 indicating a prediction of color properties that semi-finished lenses produced from a candidate production lot would possess. A lens manufacturer then chooses to either accept or reject the production lot based on any overlap between region 208 and 209.

Referring to FIG. 1B with continuing reference to FIG. 2A, process 120 provides an illustrative example of a production lot quality assessment method utilizing mathematical extrapolation. For example, at step 122, a 5-mm standard chipper plate representative of a production lot is provided to the customer, who in turn performs color measurements to obtain color values 202. At step 124, extrapolation is performed as discussed above and a predicted color region 208 is obtained. If the predicted region does not indicate that an ophthalmic lens fabricated from the production lot would have color properties within acceptable region 209, then the production lot is rejected. Otherwise, the optical properties are confirmed and a customer may request and receive production lot pellets at step 126. At step 128, the production lot is employed to mold semi-finished lenses at a mass production scale. Thereafter, at step 130, quality control testing may be performed on the lenses to determine their true corresponding color properties and assess whether the customer's specification requirements are met.

Despite the performance of mathematical extrapolation, the resulting data is not guaranteed to provide color qualities that accurately indicate the color properties of semi-finished lenses manufactured from the production lot. Thus, even if color specifications are met in initial testing, color deficiencies may be revealed during a lens mass production process due to variations in manufacturing conditions after a production lot size of several hundred pounds has been purchased. Conversely, because of the uncertainty of the predicted color region determined through mathematical extrapolation, there are situations in which a production lot may meet a customer's requirements but has been rejected because of a small overlap between possible predicted color values 208 and a color region 209 in accordance with a customer's color specifications.

Accordingly, there is a need for an accurate and efficient quality assessment method for a production lot of polycarbonate material used in the fabrication of ophthalmic lenses that does not require generation of semi-finished lenses or mathematical extrapolation schemes. In addition, there is also a need for enhanced chipper plates that provide an accurate measure of optical properties of ophthalmic lenses generated from a production lot to enable a both suppliers and customers to determine whether the production lot meets optical quality specifications.

SUMMARY OF THE INVENTION

It is an object of the present invention to provide a chipper plate sample generated from a production lot that exhibits optical properties which accurately exemplify optical properties of semi-finished lenses fabricated from the production lot.

It is a further object of the present invention to enable customers to determine optical properties of a production lot of base material without extrapolating color values measured from a production lot sample.

It is yet another object of the present invention to provide quality control methods employed during manufacturing or development of a production lot of base material that utilize an enhanced indication of color defects of articles molded from the production lot and/or an enhanced indication of production lot stabilizer defects.

These and other related objects and advantages are achieved according to the invention by providing a mold having cavities of different thicknesses to simultaneously produce different chipper plates subjected to a cycle time and temperature profile comparable to conditions employed during generation of semi-finished lenses. A resin stabilization chipper plate and a product color chipper plate may be produced in the same shot in accordance with inventive principles described herein and may, for example, have corresponding thicknesses of 5-mm and 10-mm, respectively. As discussed below, the product color chipper plate provides an accurate indication of the color properties of ophthalmic lenses fabricated from a production lot, thereby eliminating the need for customers to conduct mathematical extrapolation and thereby enabling customers to avoid the purchase of a defective production lot. Furthermore, during the production lot manufacturing process, the enhanced resin stabilization chipper plate permits a resin supplier to visually observe the stability of stabilization chemistry due to stabilizer additives in the resin and connect any deficiencies accordingly. In addition, the resin supplier may compare the resin stabilization chipper plate to the product color chipper plate and determine any corrective adjustments to their manufacturing process to bring the production lot within customer specifications. The chipper plates in accordance with aspects of tee present invention provide a means for improved quality control, thereby resulting in the production of base material that meets a customer's requirements, and provide a means for customers to efficiently and accurately confirm the optical qualities of the production lot.

Various exemplary implementations of the present principles employing the resin stabilization and product color chipper plates include a method for pelletizing base material and a method for identifying quality control defects and correcting an additive package during a base material pelletizing process. Other exemplary applications include a method for reducing quality rejections when supplying a base material production lot to customers for use in the fabrication of semi-finished lenses and a method for developing a chemical composition of a production lot for use in the fabrication of semi-finished lenses, as described herein below.

BRIEF DESCRIPTION OF THE DRAWINGS

The advantages, nature, and various additional features of the invention will appear more fully upon consideration of the illustrative embodiments now to be described in detail in connection with accompanying drawings. In the drawings:

FIG. 1A is a high level block/flow diagram illustrating a prior art process for assessing the quality of a production lot of polycarbonate material used in the fabrication of semi-finished lenses.

FIG. 1B is a high level block/flow diagram illustrating an alternative prior art process for assessing the quality of a production lot of polycarbonate material used in the fabrication of semi-finished lenses that employs mathematical extrapolation techniques on measured color values of a standard chipper plate.

FIG. 1C is a high level block/flow diagram illustrating an exemplary method for assessing the quality of a production lot of polycarbonate material used in the fabrication of semi-finished lenses employing chipper plates in accordance with aspects of the present invention.

FIG. 2A is a color plot illustrating a prior art mathematical extrapolation technique employed on color values measured from a standard chipper plate.

FIG. 2B is a color plot illustrating color values of chipper plates fabricated in accordance with the present invention that provide an accurate indication of color properties of semi-finished lenses manufactured from a production lot.

DETAILED DESCRIPTION OF PREFERRED EMBODIMENTS

Figure 3:
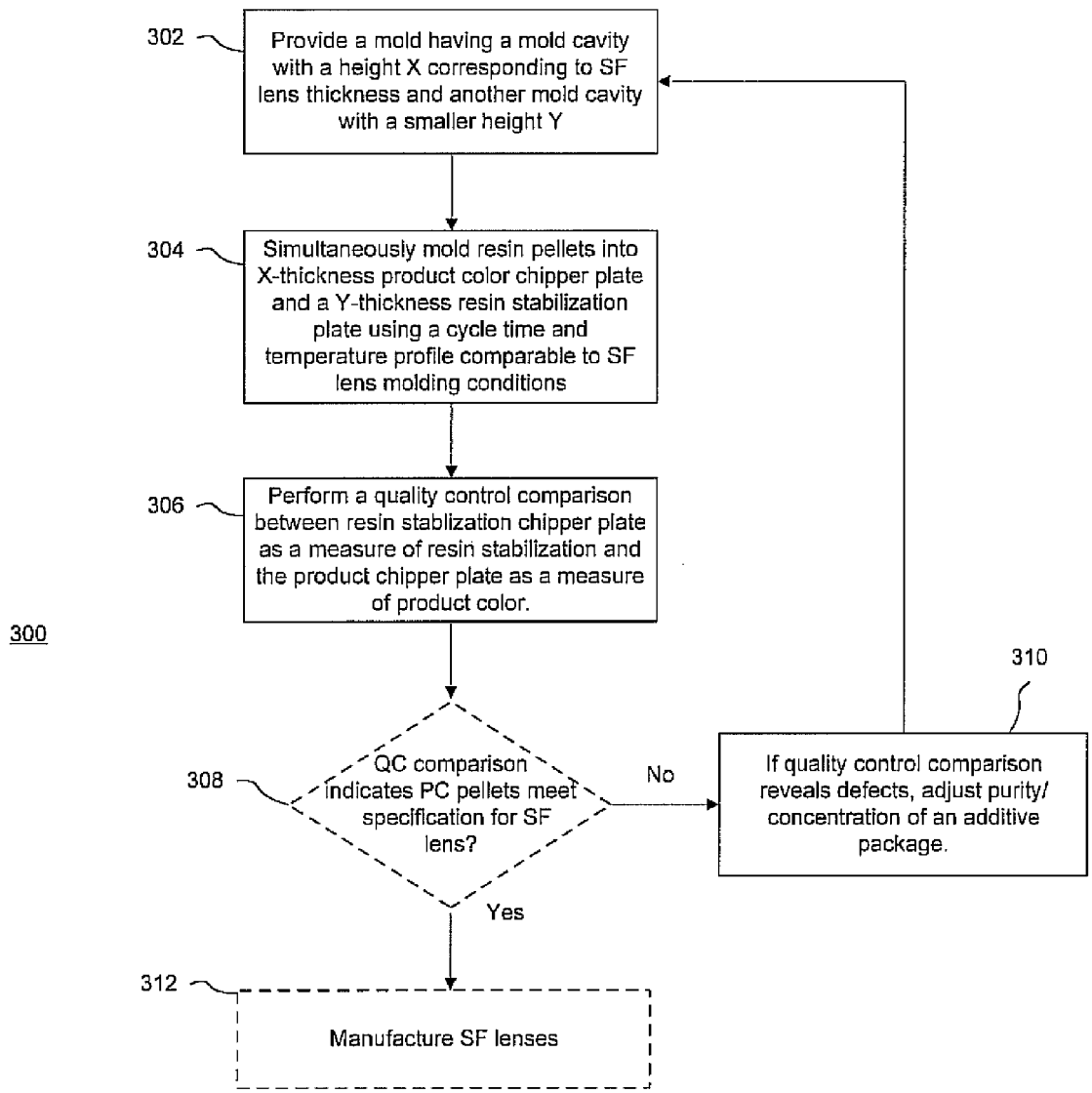
FIG. 3 is a high level block/flow diagram illustrating an exemplary method for identifying quality control defects and correcting an additive package during a polycarbonate pelletizing process to produce higher quality polycarbonate pellets for use in injection molding semi-finished (SF) lenses for ophthalmic use.

The present invention provides methods for controlling and enhancing the quality of a production lot of polycarbonate material for use in the fabrication of semi-finished lenses. As discussed above, a significant disadvantage of prior art methods is that lens manufacturers are not provided with an accurate indication of optical properties of molded articles produced from a production lot prior to purchasing the production lot. Although mathematical extrapolation methods based on an evaluation of a standard chipper plate, such as those performed at step 124 of FIG. 1B, have been developed, their results fail to provide a true measure of optical properties of semi-finished lenses molded from the production lot represented by the standard chipper plate. As discussed herein below, chipper plates produced in accordance with aspects of the invention may be employed to provide a customer an accurate indication or color properties of a production lot to both ensure that defective production lots are not unwittingly purchased and ensure that adequate production lots are not rejected due to uncertainty in optical quality testing.

Referring now to FIGS. 1A-C and 2A-B, a process 140 for confirming the optical properties of a production lot in accordance with one implementation of the present invention is illustrated. The process may begin at step 142 by receiving a resin stabilization chipper plate and the product color chipper plate fabricated in accordance with the present invention, as discussed herein below, from a supplier. The resin stabilization chipper plate and a product color chipper plate may, for example, have thicknesses of 5 mm and 10 mm, respectively. A customer may conduct quality testing on the chipper plates at step 144 to determine the optical properties of semi-finished lenses generated from the production lot from which the chipper plates were manufactured. For example, the customer may test the product color chipper plate as a measure of color properties of semi-finished lenses generated from the production lot. Additionally, the customer may test the resin stabilization chipper plate as a measure of UV transmission properties, among other properties, of semi-finished lenses generated from the production lot.

FIG. 2B depicts a c*h* scale color plot 210 illustrating results of color quality testing on the chipper plates generated in accordance with the present invention. It should be understood that other similar color plots, such as a*b* scale plots, for example, may be employed for color quality testing. In the plot, element 212 represents an exemplary color value of the resin stabilization chipper plate, element 214 depicts an exemplary color value of the product color chipper plate, and element 216 is an indication of a color region that meets the customer's specification requirements. According to the present invention, the color value 214 provides an accurate measure of the color properties of semi-finished lenses fabricated from the candidate production lot. Thus, the color value 214 of the product color chipper plate may be assessed to determine whether the values are within a color specification region 216. Unlike prior art methods, no mathematical extrapolation is necessary to obtain an accurate measure of color properties of articles molded from a candidate production lot. Furthermore, the color values 214 obtained provide a more precise measure of expected color properties as opposed to a broad predicted region 208, thereby significantly decreasing the likelihood of rejecting a production lot that is suitable for use in the fabrication of semi-finished lenses.

As depicted in FIGS. 1A-1C, in contrast to prior art processes 100 and 120, a process 140 utilizing chipper plates in accordance with the present invention enables customers to obtain an accurate measure of color properties of semi-finished lenses generated from a candidate production lot prior to purchasing a production lot and/or fabricating lenses. In this way, customers may rely on a true measure of optical properties and thereby avoid purchasing a defective production lot. In addition, suppliers may control the quality of the production lot during manufacturing by using the chipper plates according to the invention to assess latent color and stabilization properties of production lot additives and adjust them accordingly.

For example, FIG. 3 illustrates one implementation of a method 300 for identifying quality control defects and correcting an additive package during a polycarbonate pelletizing process. The method may be employed to produce higher quality polycarbonate pellets for use in injection molding semi-finished (SF) lenses for ophthalmic use. Method 300 may begin at step 302 in which a mold is provided. In accordance with aspects of the present principles the mold may have a plurality of cavities that may have different thicknesses. Specifically, a mold cavity in which a product color chipper plate is molded may have a thickness X corresponding to the thickness of a SF lens and a mold cavity in which a resin stabilization chipper plate is molded may have a thickness Y that is smaller than X. Although several mold cavities may be employed, for simplicity of explanation purposes only two mold cavities are utilized. Here, X may correspond to a thickness of 10 mm and Y may correspond to a thickness of 5 mm.

At step 304, polycarbonate pellets may be molded simultaneously into an X-thickness product color chipper plate and a Y-thickness resin stabilization chipper plate using a cycle time and temperature profile corresponding to SF lens molding conditions. Initially, polycarbonate pellets may be produced to manufacture a production lot with particular optical properties, hardness qualities, stress and slicer resistance values, and other physical properties. For example, suppliers may generate a base polycarbonate resin and determine an additive package of additives to mix with the resin that affect the physical and optical properties of a production lot by referencing known standard texts or by using commercially available software. Such additives may include, for example, solid or liquid pigments, dyes or other colorants.

Figure 4:
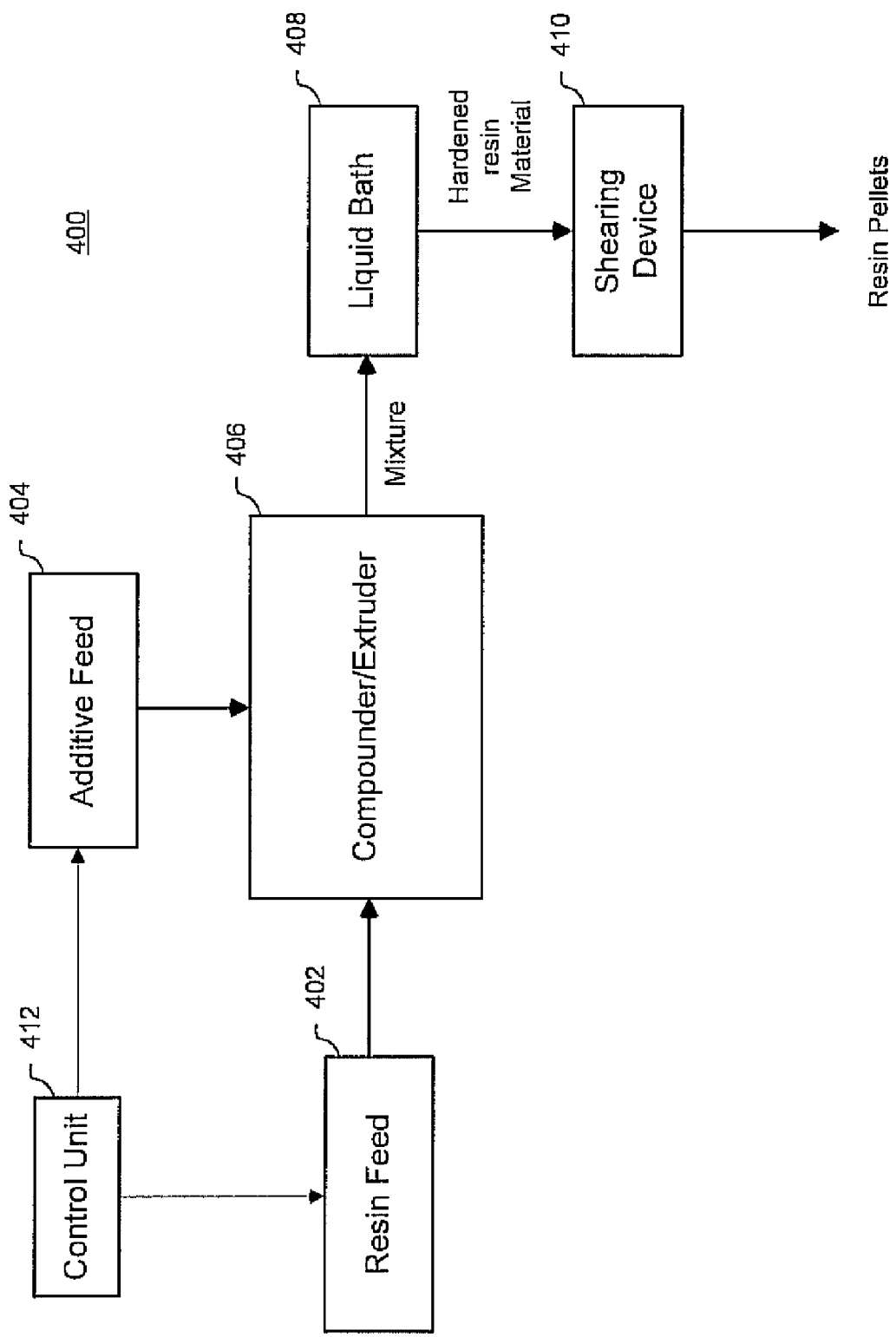
FIG. 4 is a high level block/flow diagram illustrating an exemplary system for pelletizing polycarbonate material.

With reference to FIG. 4, a high level diagram of a system 400 for manufacturing a production lot of polycarbonate pellets is illustrated. The system may include a base polycarbonate resin feed 402, an additive package feed 404, a compounder/extruder 406, a liquid cooling bath 408 and a shearing device 410. The polycarbonate resin 402 and the additive package is fed to the compounder/extruder 406, which mixes the resin and additives, and cools, plastifies and extrudes the mixture into a liquid cooling bath 408. The hardened polycarbonate material may then be cut into pellets by shearing device 410. It should be understood that other methods for generating polycarbonate pellets may be applied by those of skill in the art. For example, the pellets may be formed by molding or by other means.

Figure 5A:
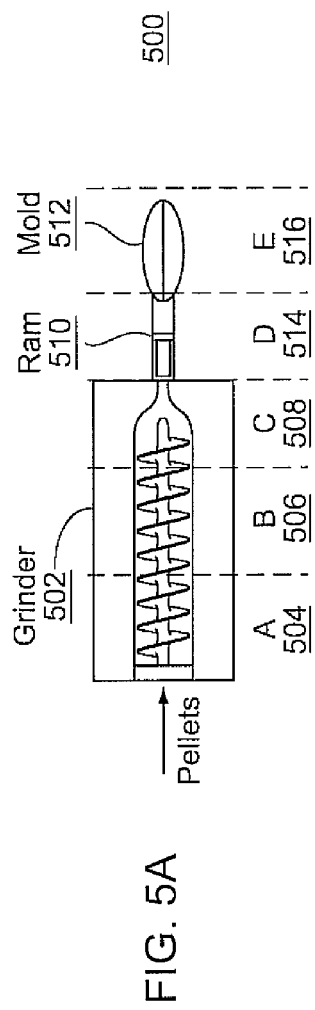
FIG. 5A is a high level block/flow diagram illustrating an exemplary system for fabricating semi-finished lenses from a production lot of polycarbonate material.
Figure 5B:
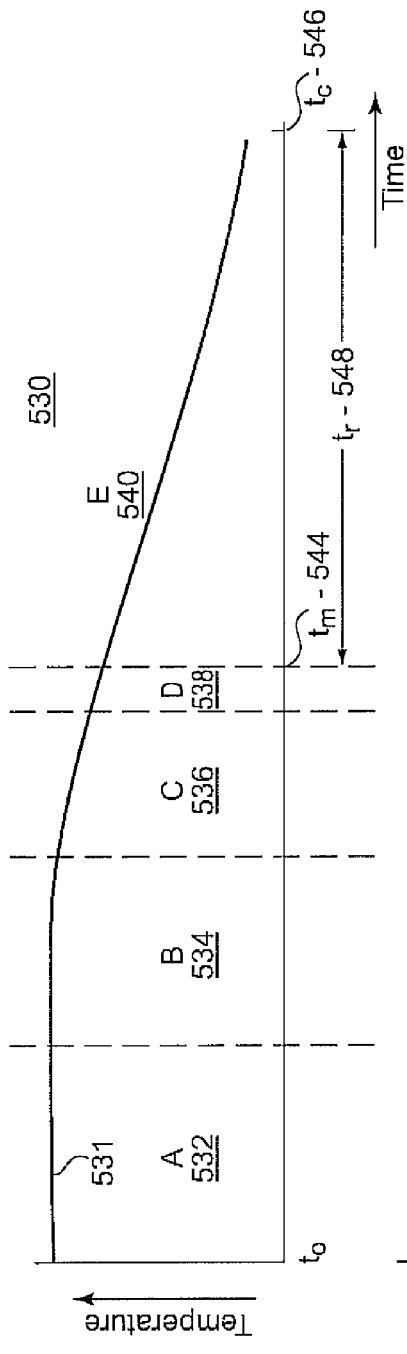
FIG. 5B is a plot illustrating an exemplary temperature profile to which polycarbonate material is subjected during the fabrication of chipper plates in accordance with the present invention.
Figure 5C:
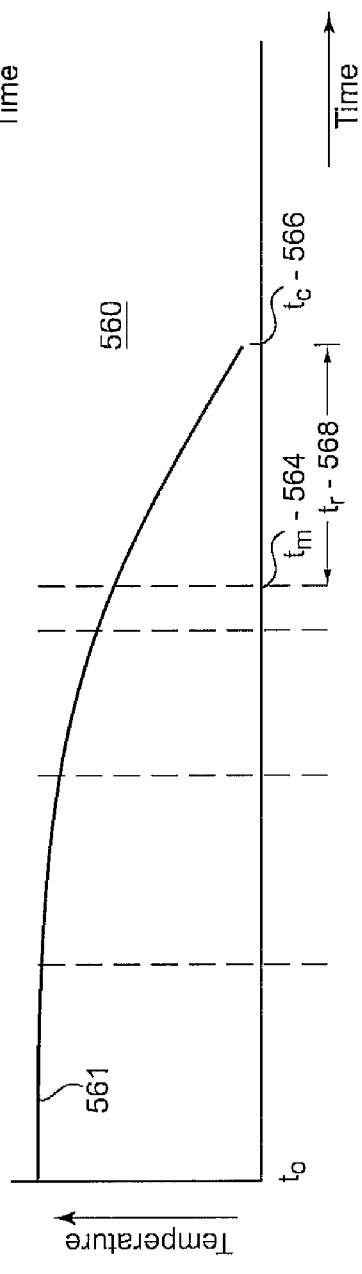
FIG. 5C is a plot illustrating a temperature profile to which polycarbonate material is subjected during the fabrication of a prior art standard chipper plate.

Returning to step 304 of FIG. 3, after obtaining an initial batch of polycarbonate pellets, the X thickness product color chipper plate and the Y thickness resin stabilization chipper plate may be molded from the polycarbonate pellets utilizing a cycle time and temperature profile corresponding to semi-finished lens molding conditions. With reference to FIG. 5, a high level block diagram 500 of a semi-finished lens molding system is illustrated in addition to a plot 530 depicting a temperature profile 531 corresponding to exemplary semi-finished lens molding conditions. The process may begin at time $t_0=0$ by depositing polycarbonate pellets within a grinder 502 in which the pellets are subjected to a temperature and pressure sufficient to plastify the pellets. The polycarbonate material passes through several grinder zones A 504, B 506, C 508 such that it is ground, plastified and formed into a flowable state. Plot 530 illustrates the temperature profile of polycarbonate material during one cycle, $t_c$ 546, which corresponds to the elapsed time between depositing polycarbonate material in grinder 502 to removing the chipper plates from the mold 512. Zones A 532, B 534, and C 536 respectively correspond to the average environmental temperature to which the polycarbonate material is subjected as it passes through zones A 504, B 506 and C 508 of grinder 502. After passing through grinder 502, the polycarbonate material may flow through a cylinder of a hydraulic ram 510, referred to as zone D 514, which pushes the polycarbonate material through a nozzle for injection into mold 512. Mold 512 corresponds to zone E 516 of system 500. Alternatively, the hydraulic ram may be replaced by a hydraulic screw, as understood by those skilled in the art. Zone D 538 of plot 530 corresponds to the average temperature of the polycarbonate material as it passes through the cylinder of the hydraulic ram 510. Similarly, Zone E 540 of plot 530 corresponds to the average temperature of the polycarbonate material during its residence in mold 512. In addition, the time at which the polycarbonate material is injected into the mold is referenced in plot 530 as $t_m$ 544.

As discussed above, mold 512 may include two cavities having a thickness of X, which is comparable to the thickness of a semi-finished lenses, and a thickness of Y, which is comparable to the thickness of a standard chipper plate. The amount of polycarbonate resin material injected into the mold through a single ram thrust is referred to herein as a shot. Thus, a shot is the amount of resin material that fills the cavities of the mold when it is clamped closed. The resin material is disposed in the mold until all of the material hardens to a sufficient state such that it retains its shape when removed from the mold. It should be understood that alternative coining processes may be employed as understood by those of ordinary skill in the art. For example, the mold may open and close one or more times to aid the hardening process. In any event, the amount of time the resin material is in the mold is referred to herein as the residence time, $t_r = t_c - t_m$. In plot 530, $t_r$ is referenced as element 548 and corresponds to zone E 540.

In accordance with aspects of the present invention, there are several advantages to subjecting polycarbonate material to a temperature profile and cycle time corresponding to SF molding conditions. For example, plot 560 of FIG. 5 is a temperature profile 561 to which a standard, 5-mm thick chipper plate is subjected between $t_0 = 0$ and $t_c$ 566 during its fabrication from a production lot. Comparison of plot 560 to plot 530 reveals that the cycle time $t_c$ 546 and residence time $t_r$ 548 of polycarbonate material under SF molding conditions is longer than the cycle time $t_c$ 566 and residence time $t_r$ 568 applied in the production of a standard chipper plate. In addition, the heat exposure of polycarbonate material under SF lens molding conditions is greater than the heat exposure of polycarbonate material during generation of a standard chipper plate. The increased thickness of a semi-finished lens over a standard chipper plate, the longer cycle time and residence time, and the greater amount of heat subjected to the polycarbonate material during fabrication of the semi-finished lens contribute to a greater degree of yellowing in the SF lens as compared to a standard chipper plate. Accordingly, because the product color chipper plate has a thickness corresponding to a SF lens and because the product color chipper plate is fabricated in accordance with SF lens molding conditions, the product chipper plate provides a more accurate indication of the color of a SF lens generated from a production lot than a standard chipper plate. Additionally, as discussed above, color properties measured from the product color chipper plate are also more accurate than extrapolated color values of a standard chipper plate of a different thickness produced from the production lot.

Further, comparison of the resin stabilization chipper plate to the product color chipper plate permits production lot suppliers to determine latent color properties of the polycarbonate pellets and thereby improve color collection through additive package adjustment. Based on the comparison, the purity, concentration and/or composition of additive packages may be adjusted to correct for color deficiencies.

Another advantage of the molding process according to the present invention is that the resin stabilization chipper plate enables suppliers to visually observe the stabilization chemistry of additives within the polycarbonate material. For example, the prior art standard chipper plate cannot accurately represent the molding conditions that an SF lens product undergoes and is not adequate to detect the effect of the "purity" of any heat stabilization package added to the resin. Thus, any adverse effect of or efficacy of heat stabilization cannot be detected using the standard chipper plate. In contrast, the resin stabilization chipper plate in accordance with the present invention has a cycle time, residence time and heat exposure sufficient to mold the product color chipper plate, which has a greater thickness than the resin stabilization plate. Due to the increased thickness of the product color chipper plate over the resin stabilization chipper plate, stabilizers within additives of the polycarbonate material in the resin stabilization chipper plate mold cavity are subjected to a longer cycle time, a longer residence time and a greater heat exposure than would otherwise be required to mold the thinner resin stabilization chipper plate. As such, latent stabilization deficiencies of stabilizers, such as heat stabilizers and UV light stabilizers, within the additive package for the polycarbonate material are revealed to suppliers via the resin stabilization chipper plate. Thus, suppliers may adjust the additive package accordingly to improve the material's stabilization properties by utilizing the resin stabilization plate as a measure of resin stabilization.

As discussed above, due to the considerable sensitivity of optical and physical properties to environmental and processing conditions under which a production lot is manufactured, especially with regard to properties of semi-finished lenses fabricated from a production lot, additive adjustment is usually required to achieve particular and rigorous optical and physical specifications. As such, returning to method 300 of FIG. 3, the purity and/or concentration of the additive package may be adjusted based on quality testing. For example, at step 306 a quality control comparison between a resin stabilization plate as a measure of resin stabilization and the product color chipper plate as a measure of product color may be made. As stated above, the resin stabilization chipper plate may be compared to the product color chipper plate to reveal latent color properties of the polycarbonate pellets. In addition, color properties of the product color chipper plate may be measured and compared to color specifications provided by a customer to determine whether the production lot meets customer color standards.

At step 308, it may be determined whether the quality control (QC) comparison indicates that the polycarbonate (PC) pellets meet semi-finished lens specifications. For example, the semi-finished lens specifications may correspond to the color property requirements provided by a customer for semi-finished lenses fabricated from a production lot. If the QC comparison indicates the polycarbonate pellets meet semi-finished lens specifications, then the method may optionally proceed to step 312 in which semi-finished lenses are manufactured. For example, the SF lenses may be manufactured by a customer that purchases a production lot of polycarbonate pellets using a molding process with conditions described above with respect to FIG. 5. Otherwise, the method may proceed to step 310.

Referring again to FIG. 4 with continuing reference to FIG. 3, at step 310, if the quality control comparison reveals defects, purity, concentration and/or content of the additive package feed 404 may be adjusted using a additive control unit 412 based on any of the quality control comparisons discussed above. For example, the adjustment may be based on a degree of resin stabilization plate color deficiencies, resin stabilization plate stabilization deficiencies, and/or product color chipper plate color deficiencies. Furthermore, the adjustment may be made to correct the deficiencies. In particular, additive package adjustment may be determined based on comparison between color properties of the resin stabilization chipper plate and the color properties of the product color chipper plate. The control unit 412 may be comprised of software stored on a storage medium employed by a processor to execute commands for adjusting one or more of a base resin feed 402 and an additive feed 404 to correct for color and/or stabilization deficiencies in response to conducting quality control comparisons, as discussed above. After additive package adjustment, steps 302-310 may be repeated until the quality control comparison indicates that the pellets meet any one or more SF lens specifications discussed above, such as SF lens product color as measured by the product color chipper plate.

In addition, it should also be understood that the molding of chipper plates, quality control comparison, and additive package adjustment may be performed simultaneously with manufacturing polycarbonate pellets. For example, after generating the initial batch of polycarbonate pellets, the pelletization process may continue through the molding of chipper plates, quality control comparison, and additive package adjustment steps, so that the additive adjustment is made during the manufacture of polycarbonate pellets.

Thus, among other benefits, the product color chipper plate and the resin stabilization chipper plates fabricated in accordance with aspects of the present invention enable polycarbonate pellet suppliers to conduct an on-site check for customer color property requirements and adjust their manufacturing process so that a production lot adequately meets customer specifications. Further, in addition to an on-site check of expected color at a lens manufacturer, simultaneous molding of a resin stabilization chipper plate and a product color chipper plate permits a resin manufacturer to have a continuity of existing data that it uses to adjust resin color. For example, the resin stabilization chipper plate may be used for correlation with existing data at a base material supplier. Moreover, comparison between the resin stabilization chipper plate and a product color chipper plate provides an on-spot check for resin property correlation between the plates. Additionally, the product color plate provides excellent predictability of lens manufacturer product qualities, as discussed above.

Figure 6:
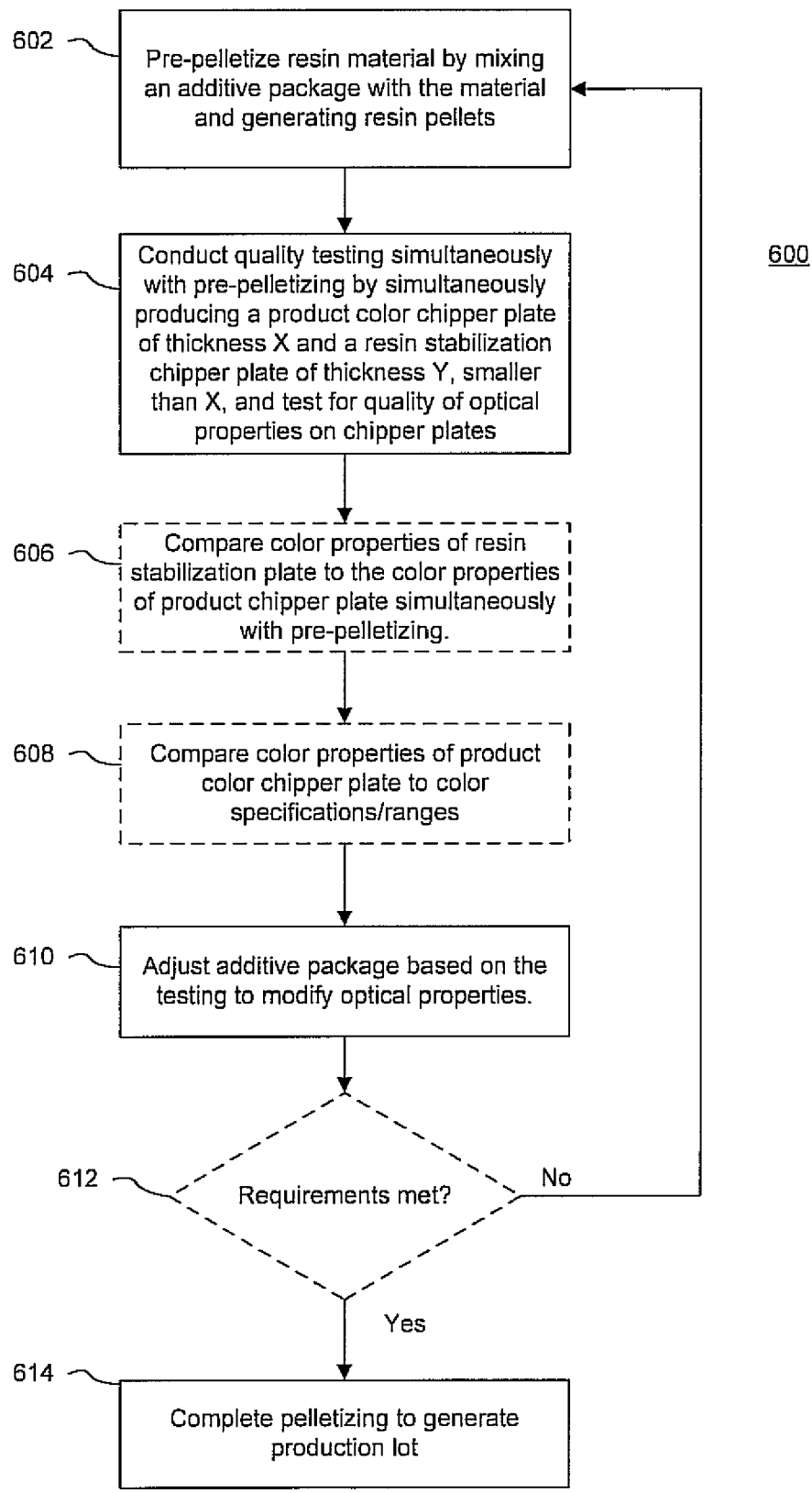
FIG. 6 is a high level block/flow diagram illustrating an exemplary method for pelletizing polycarbonate material in accordance with the present invention.

With reference now to FIG. 6, another implementation of present invention utilizing a product color chipper plate and a resin stabilization chipper plate described above includes a method 600 for pelletizing polycarbonate material. Method 600 may begin at step 602 in which polycarbonate material is pre-pelletized by mixing an additive package with the material and generating polycarbonate pellets. For example, the polycarbonate pellets may be generated as discussed above with regard to an initial batch of polycarbonate pellets utilizing system 400.

At step 604, quality testing may be conducted simultaneously with pre-pelletizing by injection molding a resin formed from the pellets to simultaneously produce a product color chipper plate having a thickness X and a resin stabilization chipper plate having a thickness Y that is smaller than X and testing for the quality of an optical property on the chipper plates. For example, the mold cavities discussed above may be employed to fabricate the chipper plates in accordance with semi-finished lens molding conditions, as discussed above with respect to FIG. 5. The chipper plates may be produced by employing an extended injection molding cycle time comparable to the cycle times utilized in the production of semi-finished lenses to enhance the chipper plates' representation of production lot qualities under client molding conditions. As discussed above, the product color chipper plate provides a more accurate indication of the color of semi-finished lenses produced from a production lot than a standard chipper plate or extrapolated color values obtained from the standard chipper plate. Similarly, the product color chipper plate may be produced in a mold by subjecting resin disposed in the mold to heat exposure comparable to heat exposure applied in molds for the production of semi-finished lenses to obtain an improved measure of color properties, which may be employed to enhance the accuracy of quality testing confirming that client specifications are met. Furthermore, a resin stabilization chipper plate of Y thickness may be produced in a mold by subjecting stabilizer additives in resin disposed in the mold to heat exposure that is required to produce a chipper plate of X thickness to reveal stabilization deficiencies of the additive package, as discussed above. In addition, it should also be understood that the quality testing may include any one or more comparisons and evaluations discussed above with respect to steps 306, 308 and/or 310.

Optionally, step 606 may be performed by comparing color properties of the resin stabilization chipper plate to the color properties of the product color chipper plate simultaneously with pre-pelletizing to determine latent color properties of the production lot and thereby improve color correction through additive package adjustment. If the resin stabilization chipper plate and the product color chipper plate are generated simultaneously in one shot, the cycle time, residence time and heat exposure applied to the resin stabilization chipper plate mold is greater than otherwise required to mold a chipper plate of its thickness. As such, due to the extended cycle time, residence time and heat exposure, the resin stabilization chipper plate reveals latent color properties of the production lot when compared to the product color chipper plate and thereby helps guide supplier's decisions in adjusting the additive package.

Optionally, step 608 may be performed by comparing color properties of the product color chipper plate to color specification ranges. For example, the comparison may be made to determine whether the production lot meets customer and/or supplier color requirements. As stated above, the product color chipper plate provides color data that is more accurate than color values measured from chipper plate with a different thickness produced from the production lot, such as a standard chipper plate. Furthermore, the product color chipper plate provides color data that is more accurate than extrapolated color values measured from a chipper plate with a different thickness produced from the production lot.

At step 610, the additive package may be adjusted based on the testing and/or comparisons to modify optical properties. The additive package may be adjusted as discussed above with regard to step 310. For example, the additive package adjustment may be made based on comparison between color properties of the resin stabilization chipper plate and color properties of the product color chipper plate. In addition, the additive package adjustment may be based on resin stabilization properties determined from the resin stabilization chipper plate.

Optionally, at step 612, it may be determined whether minimum requirements are met. For example, color values measured from the product color chipper plate may be compared to color specifications to determine whether the product lot meets client and/or supplier requirements. If the color properties of the product color chipper plate meet minimum requirements, then the pelletizing may be completed using the adjusted purity, concentration and/or composition of the additive package to generate a production lot at step 614. Otherwise steps 602-612 may be repeated until minimum requirements are met.

Figure 7:
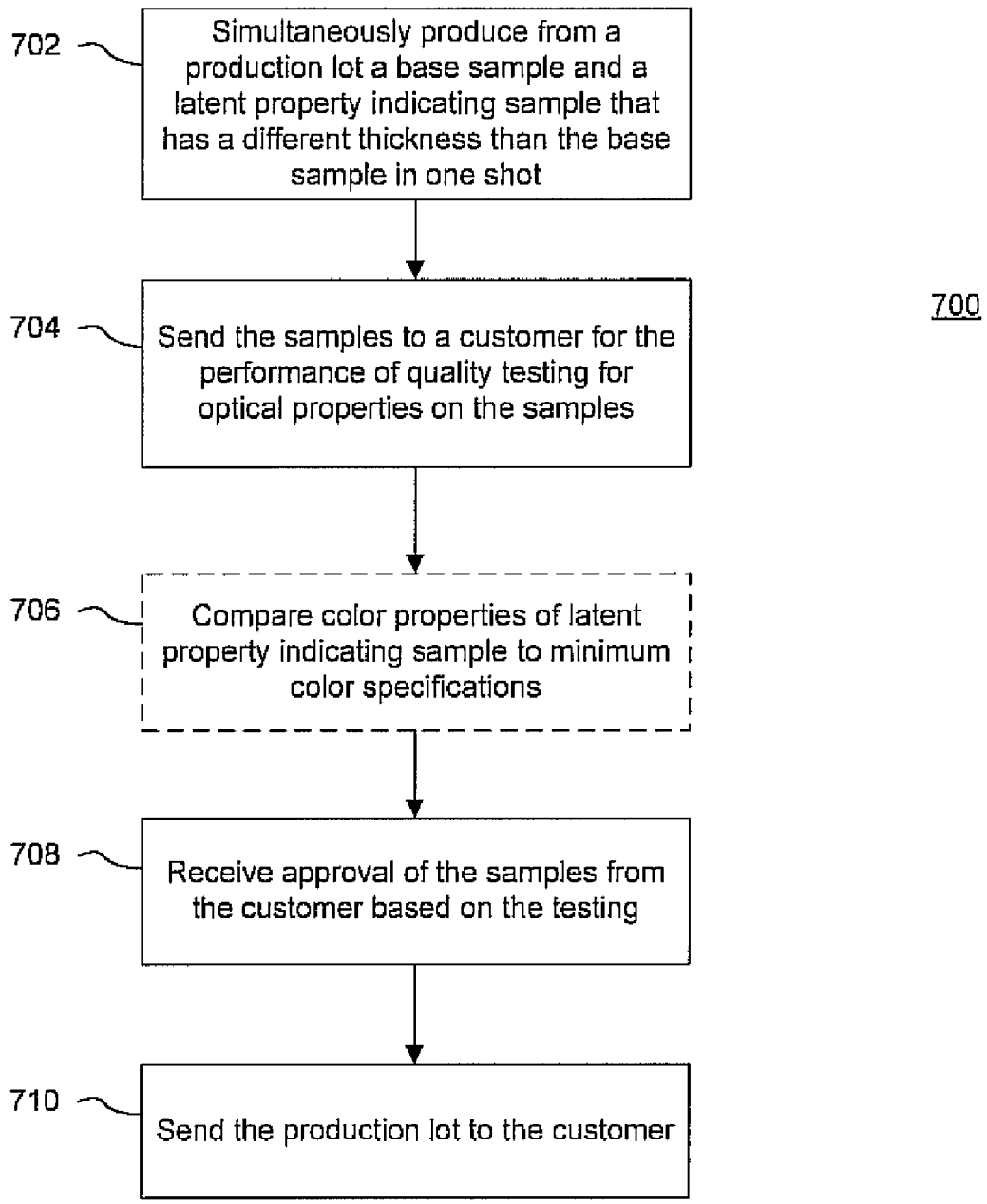
FIG. 7 is a high level block/flow diagram illustrating an exemplary method for reducing quality rejections when supplying a polycarbonate production lot to a customer for use in the fabrication of semi-finished lenses in accordance with the present invention.

With reference now to FIG. 7, in another exemplary method implementation 700 of the present invention, chipper plates produced in accordance with any one or more of aboverecited methods may be employed to reduce quality rejections when supplying a polycarbonate production lot to a customer for use in the fabrication of semi-finished lenses. As discussed above, the standard chipper plates currently used by production lot suppliers are inadequate to provide customers with an accurate indication of optical properties of semi-finished lenses fabricated from a production lot. Moreover, mathematical extrapolation techniques applied on color value measurements of standard chipper plates fail provide an adequate level of certainty of color properties of semi-finished lenses. Thus, chipper plates produced in accordance with the present invention as discussed above may be employed to address the deficiencies of current methods for determining optical properties of articles molded from a production lot.

Method 700 may begin at step 702 in which a base sample and a latent property indicating sample that has a different thickness than the base sample may be simultaneously produced from a production lot in one shot. For example, the base sample may correspond to a resin stabilization chipper plate discussed above and the latent property indicating sample may correspond to a product color chipper plate discussed above. Additionally, the base sample and the latent property indicating sample may be produced as described above with respect to method 300 and/or method 600. For example, as discussed above, mold cavities of different thicknesses may be employed to produce the samples by subjecting polycarbonate material to an extended cycle time, residence time and heat exposure. An extended injection molding cycle time comparable to cycle times utilized in the production of semi-finished lenses may be employed to enhance the samples' representation of production lot qualities under client molding conditions. Furthermore, a base sample of a Y thickness may be produced in a mold by subjecting stabilizer additives within resin disposed in the mold to heat exposure that is required to produce a sample having a thickness that is greater than Y to reveal any stabilization deficiencies of the additives within the resin. For example, the sample having a thickness greater than Y may correspond to the latent property indicating sample, which requires a greater cycle time, residence time and heat exposure than would otherwise be required to mold a sample of thickness Y. Similarly, the latent property indicating sample may be produced in a mold by subjecting resin disposed in the mold to heat exposure that is comparable to heat exposure applied in molds for the production of semi-finished lenses to obtain an improved measure of color properties and thereby enhance the accuracy of quality testing confining that client specifications are met.

At step 704, the samples may be sent to a customer for the performance of quality testing for optical properties on the samples. For example, the base sample may have a thickness of five millimeters, corresponding to a thickness of a standard chipper plate, and the latent property indicating sample may have a thickness of ten millimeters, corresponding to the thickness of a semi-finished lens. The base sample may be employed by a customer to conduct quality testing for properties other than color, such as light transmission properties, UV light blocking capabilities, stress resistance properties, haze and other testing that is currently conducted on a standard chip. If the base sample has the same thickness as a standard chip, the same equipment and testing for properties other than color currently applied to the standard chipper plate may be conveniently applied to the base sample.

It should be noted that in relation to lens manufacturing, quality testing for UV light transmission, stress and crack resistance, is better suited for the thinner base sample, as its thickness is closer to the thickness of a spectacle lens that a user would actually wear. It should also be noted here that a semi-finished lens is a type of lens blank that is thicker than a spectacle lens and is machined to a desired thickness and vertex power for a spectacle lens. Semi-finished lenses are often circularly shaped and typically have a thickness of approximately 10 millimeters.

Returning to step 704, quality testing for color qualities may be applied to the latent property indicating sample. As discussed above, the product color chipper plate, to which the latent property indicating sample may correspond, provides an accurate measure of color because of the extended cycle time and temperature profile employed in its fabrication. Furthermore, the latent property indicating sample provides a greater certainty of color than extrapolated color values obtained from a standard chipper plate. Thus, the because the latent property indicating sample provides a more accurate and certain indication of color properties of semi-finished lenses upon which lens manufacturers may rely, quality rejections of production lots by customers are reduced.

Method 700 may optionally include step 706, in which a customer may compare the color properties of the latent property indicating sample to minimum color specifications such that the comparison provides color data that is more accurate than extrapolated color values of a chipper plate with a different thickness produced from the production lot. For example, the chipper plate with a different thickness may correspond to a standard chipper plate.

At step 708, approval of the samples may be received from a customer based on quality testing. Thereafter, at step 710, method 700 may be completed by sending the production lot to the customer.

As discussed above with respect to FIGS. 1A-1C, employing chipper plates or samples fabricated in accordance with the present invention enables customers to obtain an accurate measure of color properties prior to purchasing a production lot so that they may both avoid purchasing a defective production lot and avoid rejecting a production lot that is suitable for use in the fabrication of semi-finished lenses. Moreover, these advantages may be achieved without performing or relying on uncertain mathematical extrapolation methods used with prior art standard chipper plates.

Figure 8:
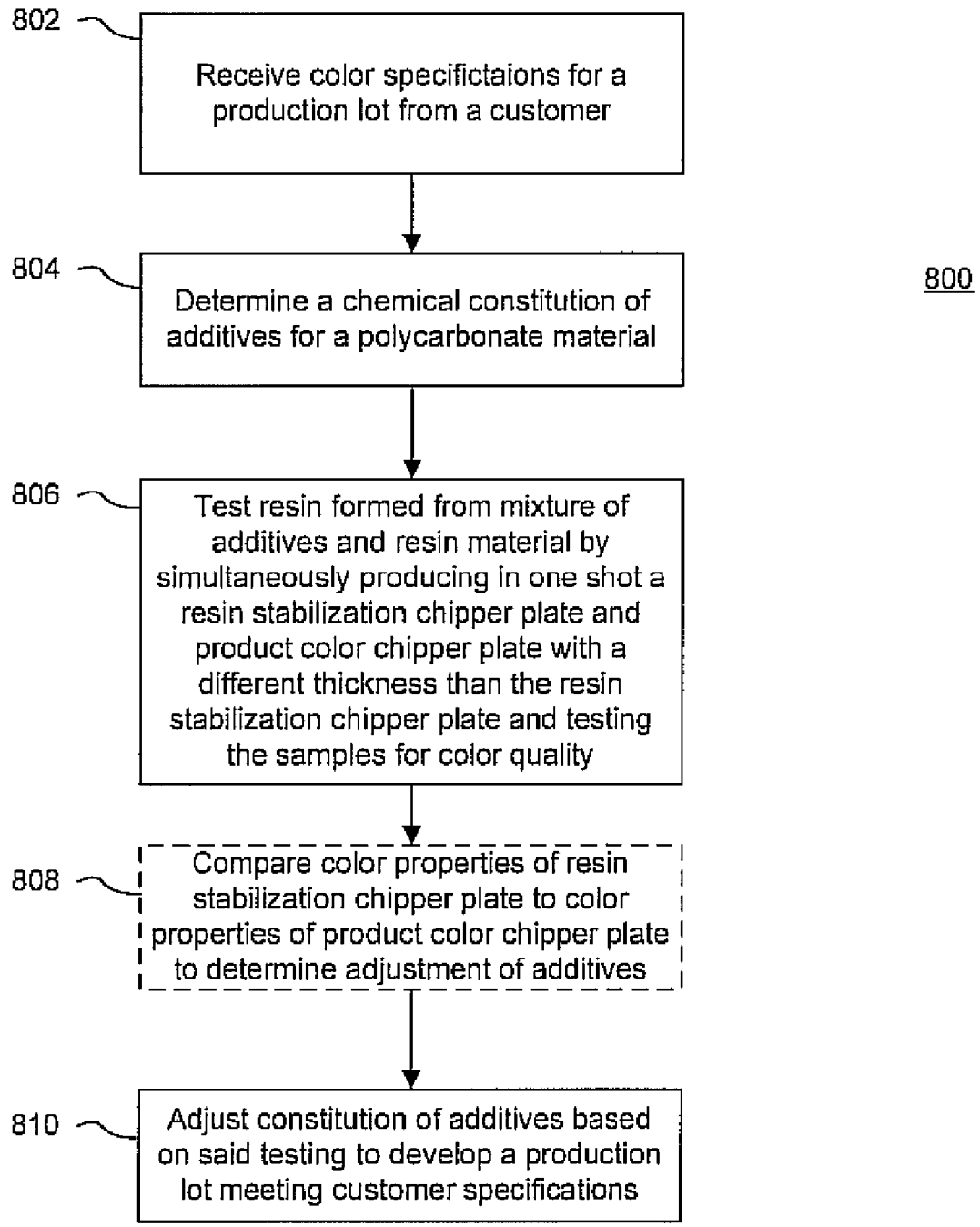
FIG. 8 is a high level block/flow diagram illustrating an exemplary method for developing a chemical composition of a production lot for use in the fabrication of semi-finished lenses in accordance with the present invention.

With reference to FIG. 8, another exemplary method implementation utilizing chipper plates described above produced in accordance with the present invention includes a method 800 for developing a chemical composition of a production lot for use in the fabrication of semi-finished lenses. As illustrated below, due to the accurate measure of color properties of the product color chipper plate, as well as the improved indication of stabilization deficiencies and latent color properties provided by the resin stabilization chipper plate, new polycarbonate materials may be developed faster and more efficiently.

Method 800 may begin at step 802 in which color specifications for a production lot is received from a customer. For example, the color specifications may include color requirements for articles molded from the production lot. In addition, specification for other physical properties of articles molded from the production lot, such as UV light transmission, stress and crack resistance, may also be received.

At step 804, a chemical constitution of additives for a polycarbonate material may be determined. For example, the determination may be based on any method discussed above with respect to producing an initial batch of polycarbonate pellets in accordance with method 300. Alternatively, the determination may be based on new theoretical developments concerning new additive compositions or concentrations.

At step 806, polycarbonate resin formed from a mixture of additives and the polycarbonate material may be tested by simultaneously producing in one shot resin stabilization chipper plate and a produce color chipper plate that has a different thickness than the base sample and testing the samples for color quality. The chipper plates may be produced and tested as described above with respect to FIG. 5, method 300 and method 600. For example, as described above with respect to FIG. 5, the resin stabilization chipper plate and the product color chipper plate may be produced using two respective mold cavities having different thicknesses by subjecting polycarbonate material to an extended cycle time, residence time, and heat exposure. For example, the heat exposure and cycle time may be comparable to heat exposure and cycle time applied in molds for the production of semi-finished lenses.

As stated above, benefits include a resulting product color chipper plate that provides an accurate measure of color of a semi-finished lens fabricated from a production lot. Thus, the product color chipper plate may be tested for color properties to confirm that the production lot meets minimum customer color specifications without evaluation by the customer. In addition, comparison to minimum color specifications provides color data that is more accurate than extrapolated color values of a standard chipper plate having a different thickness produced from the production lot. Because the supplier has an accurate, on-site representation of a client's product color under client molding conditions, the supplier may herself determine that specifications are met and need not wait for customer feedback concerning a production lot. As a result, new material development time may be reduced.

Development time may also be reduced due to the improved indication of stabilizer deficiencies provided by the resin stabilization plate. As stated above, because of the increased thickness of the product color chipper plate over the resin stabilization chipper plate, stabilizers within additives of the polycarbonate material in the resin stabilization chipper plate mold cavity are subjected to a longer cycle time, a longer residence time and a greater heat exposure than would otherwise be required to mold the thinner resin stabilization chipper plate. The extended temperature profile under which the resin stabilization chipper plate is produced enables suppliers to determine stabilization deficiencies of heat stabilizer additives, UV light absorption stabilizer additives, and other stabilizer additives. Accordingly, based on an improved indication of stabilizer chemistry revealed through testing conducted on the resin stabilization plate, suppliers may adjust the constitution, which includes purity and/or concentration, of additives mixed with the polycarbonate material in an efficient manner to thereby reduce development time.

Furthermore, development time may be further reduced through additive adjustment based on color deficiencies revealed by a comparison between the resin stabilization chipper plate and the product color chipper plate. As described above, the comparison enables suppliers to determine latent color properties of the polycarbonate material and adjust the composition of additives accordingly to correct any color deficiencies and bring the polycarbonate material within minimum color specifications. Thus, step 808 may optionally be performed, in which color properties of the resin stabilization chipper plate are compared to color properties of the product color chipper plate to determine the adjustment of additives required to correct color properties and thereby reduce development time.

At step 810, the constitution of additives may be adjusted based on the testing and/or comparisons to develop a production lot meeting minimum specifications.

It should be understood that although the present invention has been described with respect to a polycarbonate base material, the features of the present invention discussed above are equally applicable to any base material used to fabricate semi-finished lenses by injection molding. Such base materials, include, for example, polycarbonate, polyamide, polyimide, polysulfone, copolymers of polyethyleneterephthalate and polycarbonate, polyolefin, homopolymers and copolymers of diethylene glycol bis(allylcarbonate), homopolymers and copolymers of (meth)acrylic monomers, homopolymers and copolymers of thio(meth)acrylic monomers, homopolymers and copolymers of urethane, homopolymers and copolymers of thiourethane, epoxy homopolymers and copolymers, and episulfure homopolymers and copolymers. Such base materials also include materials that are highly sensitive to heat and shear, such as thermoplastic polyurethanes, for example.

It should also be understood that the term "resin" or "resins" as employed herein above include specialty resins in addition to standard resins. Such specialty resins also include UV-400 materials that have higher concentration of UV additives, have a higher yellow index than standard grades and have a higher susceptibility to yellowing upon processing. Such specialty resins further include colored resins and resins with heat and shear sensitive dyes.

Having described preferred embodiments for controlling and enhancing the quality of polycarbonate material employed for the production of semi-finished ophthalmic lenses, it is noted that modifications and variations can be made by persons skilled in the art in light of the above teachings. It is therefore understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for identifying quality control defects and correcting an additive package during a base material pelletizing process to produce higher quality base material pellets for use in injection molding semi-finished (SF) lenses for ophthalmic use, comprising the steps of:

provided a mold having cavities of different thicknesses including a first mold cavity with a first height X corresponding to a thickness of a SF lens and a second mold cavity with a smaller height Y;

simultaneously molding the same base material pellets into an X thickness product color chipper plate within the first cavity and a Y thickness resin stabilization chipper plate within the second cavity utilizing a cycle time and temperature profile corresponding to SF lens molding conditions;

performing a quality comparison between the resin stabilization chipper plate as a measure of resin stabilization and the product color chipper plate as a measure of SF lens product color; and if the quality control comparison reveals defects, adjusting one of purity or concentration of an additive package based on the degree of stabilization plate deficiencies during a base material pelletizing process.

2. The method of claim 1, further comprising:

repeating said simultaneous molding step, said performing step and said adjusting step until the quality control comparison indicates that the base material pellets meet a specification for SF lens product color, as measured by the product color chipper plate.

3. The method of claim 1, further comprising:
manufacturing SF lenses by injection molding the base material pellets.

4. The method of claim 1, wherein said performing step further comprises comparing color properties of the resin stabilization chipper plate to the color properties of the product color chipper plate to determine latent color properties of the base material pellets and thereby improve color correction through additive package adjustment.

5. The method of claim 1, wherein said performing step further comprises comparing color properties of the product color chipper plate to minimum color specifications such that the color comparison provides color data that is more accurate than extrapolated color values of a chipper plate with a different thickness produced from the production tot.

6. The method of claim 1, wherein said simultaneously molding step further comprises producing the resin stabilization chipper plate of Y thickness by subjecting stabilizers within additives in base material disposed in the second mold cavity to heat exposure required to produce a chipper plate of X thickness to reveal stabilization deficiencies within the additive package.

7. A method for pelletizing base material comprising:
pre-pelletizing the base material by mixing an additive package with the material and by extruding the mixture to generate base material pellets;
conducting quality testing simultaneously with pre-pelletizing by injection molding the same resin formed from the pellets within a single mold having cavities of different thicknesses to simultaneously produce a product color chipper plate within a first cavity having a thickness of X and resin stabilization chipper plate within a second cavity having a thickness of Y that is smaller than X and testing for the quality of an optical property on the chipper plates;
adjusting the additive package based on said testing to modify optical properties; and
completing the pelletizing to generate a production lot in response to confirming that minimum requirements are met.

8. The method of claim 7, further comprising:
comparing color properties of the resin stabilization chipper plate to the color properties of the product color chipper plate simultaneously with pre-pelletizing to determine latent color properties of the production lot and thereby improve color correction through additive package adjustment.

9. The method of claim 7, wherein the conducting quality testing step further comprises producing the chipper plates by employing an extended injection molding cycle time comparable to cycle times utilized in the production of a semi-finished lenses to enhance the chipper plates representation of production lot qualities under client molding conditions.

10. The method of claim 7, further comprising the step of:
comparing color properties of the product color chipper plate to minimum color specifications such that the comparison provides color data that is more accurate than extrapolated color values of a chipper plate with a different thickness produced from the production lot.

11. The method of claim 7, wherein the conducting quality testing step further comprises producing the resin stabilization chipper plate of Y thickness in a mold by subjecting stabilizer additives in resin disposed in the mold to heat exposure that is required to produce a chipper plate of X thickness to reveal stabilization deficiencies of the additive package.

12. The method of claim 7, wherein the conducting quality testing step further comprises producing the product color chipper plate in a mold by subjecting resin disposed in the mold to heat exposure comparable to heat exposure applied in molds for the production of semi-finished lenses to obtain an improved measure of color properties and thereby enhance the accuracy of quality testing confirming that client specifications are met.

13. A method for reducing quality rejections when supplying a base material production lot to a customer for use in the fabrication of semi-finished lenses comprising:
simultaneously producing from the same production lot within one mold having cavities of different thicknesses a base sample within a first cavity and a latent property indicating sample within a second cavity that has a different thickness than the base sample in one shot;
sending the samples to the customer for the performance of quality testing for optical properties on the samples;
receiving approval of the samples from the customer based on said testing; and
sending the production lot to the customer.

14. The method of claim 13, wherein the simultaneously producing step further comprises employing an extended injection molding cycle time comparable to cycle times utilized in the production of semi-finished lenses to enhance the samples' representation of production lot qualities under client molding conditions.

15. The method of claim 13, further comprising the step of:
comparing the color properties of the latent property indicating sample to minimum color specifications such that the comparison provides color data that is more accurate than extrapolated color values of a chipper plate with a different thickness produced from the production lot.

16. The method of claim 13, wherein the thickness of the base sample is Y and wherein the simultaneously producing step further comprises producing the base sample in a mold by subjecting stabilizer additives within resin disposed in the mold to heat exposure that is required to produce a sample having a thickness that is greater than Y to reveal any stabilization deficiencies of the additives within the resin.

17. The method of claim 13, wherein the simultaneously producing step further comprises producing the latent property indicating sample in a mold by subjecting resin disposed in the mold to heat exposure that is comparable to heat exposure applied in molds for the production of semi-finished lenses to obtain an improved measure of color properties and thereby enhance the accuracy of quality testing confirming that client specifications are met.

18. A method for developing a chemical composition of a production lot for use in the fabrication of semi-finished lenses comprising:
receiving minimum color specifications for a production lot from a customer;
determining a chemical constitution of additives for a base material;
testing a base material resin formed from a mixture of additives and the base material by simultaneously injecting one shot into a mold having cavities of different thicknesses a resin stabilization chipper plate within the first cavity and a product color chipper plate within the second cavity that has a different thickness than the resin stabilization chipper plate and testing the chipper plates for color quality;
adjusting constitution of the additives based on said testing to develop a production lot meeting the minimum color specifications.

19. The method of claim 18, further comprising the step of:
comparing color properties of the resin stabilization chipper plate to the color properties of the product color chipper plate to determine the adjustment of additives required to correct color properties and thereby reduce development time.

20. The method of claim 18, wherein the testing step further comprises testing the product color chipper plate for color properties to confirm that the production tot meets minimum customer color specifications without evaluation by the customer to thereby reduce development time.

21. The method of claim 20, wherein the testing step further comprises producing the product color chipper plate by in a mold by subjecting resin disposed in the mold to heat exposure that is comparable to heat exposure applied in molds for the production of semi-finished lenses to obtain an improved measure of color properties and thereby enhance the accuracy of an assessment that minimum color specifications are met.

22. The method of claim 18, wherein the testing step further comprises producing the chipper plates by employing an extended injection molding cycle time comparable to cycle times utilized in the production of semi-finished lenses to enhance the samples' representation of production lot qualities under client molding conditions.

23. The method of claim 18, the testing step further comprises comparing the color properties of the product color chipper plate to minimum color specifications such that the comparison provides color data that is more accurate than extrapolated color values of a chipper plate with a different thickness produced from the production lot.

24. The method of claim 18, wherein the thickness of the resin stabilization chipper plate is Y and wherein the testing step further comprises producing the resin stabilization chipper plate in a mold by subjecting stabilizer additives within resin disposed in the mold to heat exposure required to produce a chipper plate having a thickness that is greater than Y to reveal any stabilization deficiencies of the additives within the resin.

* * * * *

UNITED STATES PATENT AND TRADEMARK OFFICE
CERTIFICATE OF CORRECTION

PATENT NO. : 8,066,920 B2
APPLICATION NO. : 12/482927
DATED : November 29, 2011
INVENTOR(S) : Gazaille et al.

It is certified that error appears in the above-identified patent and that said Letters Patent is hereby corrected as shown below:

Column 15, line 16 (claim 5, line 6), after "production" delete "tot" and insert --lot--;

line 53 (claim 9, line 5), insert an --'-- after "plates"; and

Column 16, line 65 (claim 18, line 16), insert the word --the-- between "adjusting" and "constitution."

Signed and Sealed this
Twenty-eighth Day of February, 2012

David J. Kappos
*Director of the United States Patent and Trademark Office*